United States Patent Office 3,124,578
Patented Mar. 10, 1964

3,124,578
METHOD OF PRODUCING CYCLOTRI-
METHYLENETRINITRAMINE
Hans-Joachim Riedl, Recklinghausen, Germany, assignor to Wasag-Chemie A.G., Essen, Germany
No Drawing. Filed Sept. 19, 1961, Ser. No. 139,063
7 Claims. (Cl. 260—248)

The present invention relates to a method of producing cyclotrimethylenetrinitramine.

Cyclotrimethylenetrinitramine has been produced in the past by nitrating the potassium salt of methyleneaminosulfonic acid with mixed acid as a nitrating agent. It was assumed up to now that of all the known salts of methylene aminosulfonic acid, the potassium salt is best suitable for producing cyclotrimethylenetrinitriamine, notwithstanding the fact that the production of the potassium salt requires a relatively complicated and involved process.

The potassium methyleneaminosulfonate was then nitrated with a mixed acid consisting of about 80% nitric acid and about 20% sulfuric acid, however, the maximum yield obtainable of cyclotrimethylenetrinitramine was 90%, in fact, on an industrial scale a yield of only about 82% of the theoretical yield could be obtained. The residual organic substance remained in the waste acid and greatly complicated the working up of the same, particularly due to oxidation of the organic material and contamination of the waste acid by the same.

In order to render the method economically feasible, the potassium bisulfate formed during the nitration must be recovered. The presence of residual organic substance in the waste acid is thus a very serious shortcoming of the above method. Due to the involved procedure required for forming the potassium salt which was to serve as the starting material, and due to the difficulties encountered in the recovery of the potassium bisulfate, as well as due to the relatively low yield, the above discussed method was found to be uneconomical and has been largely abandoned.

It is therefore an object of the present invention to overcome the above discussed difficulties and disadvantages in the production of cyclotrimethylenetrinitramine.

It is another object of the present invention to provide a simple and economical method for producing cyclotrimethylenetrinitramine.

Other objects and advantages of the present invention will become apparent from a further reading of the description and of the appended claims.

With the above and other objects in view, the present invention contemplates a method of producing cyclotrimethylenetrinitramine, comprising the steps of reacting ammonium methyleneaminosulfonate at a temperature of between about −30° C. and +30° C. with an anhydrous nitrating agent, and separating the thus formed cyclotrimethylenetrinitramine.

Surprisingly it has been found that cyclotrimethylenetrinitramine can be produced in a technically as well as economically advantageous manner by nitrating the ammonium salt of methyleneaminosulfonic acid. This is all the more surprising since the ammonium salt of methyleneaminosulfonic acid is described in the chemical literature as unstable, i.e., liable to decompose, particularly at temperatures of 50° C. or higher.

However, applicants have found that in the manner described hereinbelow ammonium methyleneaminosulfonate can be successfully nitrated so as to give an excellent yield of cyclotrimethylenetrinitramine, and that this process can be carried out in a far simpler manner, requiring fewer reaction steps, than the nitration of the corresponding potassium salt.

The nitration of the ammonium salt corresponds to the following equation:

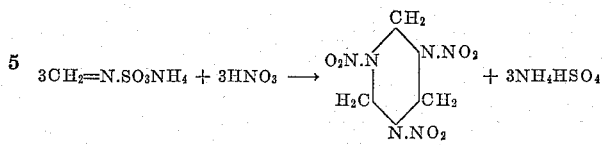

Surprisingly, nitration of the ammonium salt instead of the potassium salt of methyleneaminosulfonic acid will result in several significant advantages of which the most important are that:

(1) Proper nitration of the ammonium salt will give a practically 100% yield of cyclotrimethylenetrinitramine;

(2) Due to the substantially theoretical yield of cyclotrimethylenetrinitramine, the waste acid will be free of organic substances or at most will only contain traces thereof, so that the waste acid can be further processed without difficulty;

(3) Since the waste acid will contain substantially only ammonium bisulfate and more or less diluted nitric acid, it is possible to work up the waste acid directly and without preliminary processing or purification so as to obtain technical ammonium salts such as ammonium sulfate or ammonium sulfate niter. Thus the waste products accruing by following the method of the present invention can be utilized completely in accordance with conventional methods.

Due to the fact that ammonia generally is easily available at low cost, it is not necessary to engage in an involved process for reconstituting the starting material from the waste products, while such working up of the waste products so as to reconstitute the starting material for the nitrating process was required according to the prior art methods which use the potassium salt and not the ammonium salt as starting material.

Ammonium aminosulfonate can be produced in the so-called chamber process by reacting in the gas phase sulphur trioxide and ammonia, whereby a mixture consisting of about 60% of the ammonium salt of aminosulfonic acid and 40% of the ammonium salt of iminodisulfonic acid is obtained. The amomnium iminosulfonate can then be split by conventional methods into ammonium aminosulfonate and ammonium sulfate. It is of course also possible to obtain without difficulties the ammonium salt of aminosulfonic acid by reacting urea with oleum thereby forming aminosulfonic acid and by then neutralizing the acid with amomnia.

Ammonium methyleneaminosulfonate is then obtained by reacting ammonium aminosulfonate with formaldehyde. The thus-formed salt may then be precipitated with alcohol from the initially formed aqueous solution.

However, it is also possible to crystallize ammonium methyleneaminosulfonate directly from its aqueous solution without employing alcohol or any other precipitating agent, provided that the aqueous solution is of sufficiently high concentration. Such high concentration of the aqueous solution is obtained by careful evaporation of a dilute solution, or by producing the ammonium methyleneaminosulfonate at a concentration above the saturation point of the aqueous solution.

For instance, solid ammonium aminosulfonate may be introduced into a commercial formaldehyde solution of about 40% concentration, whereby a temperature below 50° C. and preferably below 40° C. and a pH of between 3 and 7, preferably between 4 and 5 should be maintained. In this manner a solution is obtained from which part of the ammonium methyleneaminosulfonate will crystallize at room temperature and a greater proportion at lower temperatures.

By allowing the solution to stand so as to achieve partial evaporation of the water, or by careful evaporation, preferably under a partial vacuum at a temperature below 50° C., preferably below 40° C., the mother liquor can be evaporated to dryness and thus the ammonium salt will be obtained in an excellent yield. It is of course also possible to evaporate the entire salt solution without first crystallizing and removing part of the salt.

A particularly pure ammonium salt is obtained by spraying the solution with preferably warm gases such as air. It is also possible to use a vacuum drum dryer for obtaining the solid salt from its aqueous solution.

The preferred pH value of between 4 and 5 can be easily maintained by producing the ammonium methyleneaminosulfonate in a continuous manner. Evaporation of the aqueous solution, particularly by spraying is also preferably carried out as a continuous process.

Residual mother liquor can be decomposed by boiling into ammonium sulfate and formaldehyde and thus further utilized.

Without limiting the present invention to the structural formula given below, present investigations indicate that the ammonium methyleneaminosulfonate probably occurs in trimeric form in accordance wtih the following formula:

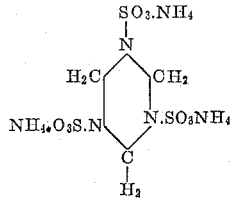

Nitrating of the ammonium methyleneaminosulfonate may be carried out with concentrated nitric acid, if desired in the presence of ammonium nitrate. Since a quantitative, 100% yield can be obtained only under complete exclusion of water, preferably a sulfurtrioxide-containing nitric acid or mixed acid is used. The sulfurtrioxide content may be between 0 and 50°, preferably between 10 and 20%. The nitration may also be carried out with a nitric acid containing nitrogen pentoxide. The nitration reaction is carried out without difficulties within a temperature range of between $-30°$ C. and $+30°$ C., preferably within a range of between 0° C. and $+20°$ C. and can be easily arranged in a continuous manner.

A portion of the thus-formed cyclotrimethylenetrinitramine will crystallize during the nitration process, and the entire cyclotrimethylenetrinitramine will be precipitated by diluting the reaction mixture with water. The thus obtained crude product already is of high purity and has a melting point of at least 200° C.

The waste acid obtained according to the method of the present invention either may be worked up directly into a mixture of ammonium sulfate and ammonium nitrate such as ammonium sulfate niter or mixed fertilizer, or the waste acid may be split by conventional denitrating methods into nitric acid and ammonium bisulfate, or an ammonium bisulfate-containing sulfuric acid which may be used as the starting material for producing ammonium sulfate.

The following examples are given as illustrative only without limiting the invention to the specific details described in the examples.

*Example I*

50 parts by weight of ammonium methyleneaminosulfonate are introduced under stirring at a temperature of between 10 and 15° C. into 100 parts by weight of a mixed acid consisting of 80% nitric acid and 20% sulfurtrioxide. After introduction of the ammonium salt is completed, stirring is continued for 5 minutes while the temperature of the reaction mixture is maintained at 20° C. The reaction mixture is then poured onto 190 parts by weight of ice. A yield of 29.2 parts by weight of cyclotrimethylenetrinitramine having a melting point of 201° C. is obtained substantially corresponding to the theoretical yield.

The waste acid is neutralized with ammonia and, upon evaporation, will yield 155 parts by weight of a salt mixture consisting of about 45% ammonium nitrate and about 55% ammonium sulfate. This salt mixture may be used as fertilizer.

*Example II*

50 parts by weight of ammonium methyleneaminosulfonate are introduced under stirring at a temperature of 10° C. into 90 parts by weight of a nitric acid containing 10% nitrogen pentoxide. After introduction of the ammonium salt is completed, stirring is continued for 15 minutes at a temperature of 10° C. and then the reaction mixture is poured onto 160 parts by weight of ice. 29.3 parts by weight of cyclotrimethylenetrinitramine, corresponding to the theoretical yield, and having a melting point of 203° C. are obtained in this manner.

The waste acid is evaporated to dryness, leaving a residue of 46 parts by weight of ammonium bisulfate. The distillate consists of 222 parts by weight of aqueous nitric acid of about 30% nitric acid content which may be re-used after further concentration. The ammonium bisulfate may be used for producing ammonium sulfate in a conventional saturator.

*Example III*

50 parts by weight of ammonium methyleneaminosulfonate are introduced under stirring and at a temperature of 15° C. into 100 parts by weight of a nitrating acid composed of 80% $HNO_3$, 14% $SO_3$ and 6% $H_2SO_4$. 5 minutes after introduction of the ammonium salt is completed, the reaction mixture is poured onto ice. The yield of cyclotrimethylenetrinitramine is 100% and the thus-obtained crude product has a melting point of 201° C.

The waste acid is denitrated and the thus-obtained mixture of ammonium bisulfate and sulfuric acid is introduced into a saturator for the production of ammonium sulfate.

*Example IV*

50 parts by weight of ammonium methyleneaminosulfonate are introduced under stirring and at a temperature of between 5 and 10° C. into 100 parts by weight of concentrated nitric acid. After introduction of the ammonium salt has been completed, stirring is continued for 10 minutes at room temperature and thereafter the reaction mixture is poured onto ice. A yield of about 75% of cyclotrimethylenetrinitramine having a melting point of 201° C. is obtained.

The waste acid is converted in conventional manner into a nitrogen-containing fertilizer.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing cyclotrimethylenetrinitramine, comprising the steps of reacting ammonium methyleneaminosulfonate under exclusion of water at a temperature of between about $-30°$ C. and $+30°$ C. with an anhydrous nitrating agent selected from the group consisting of sulfur trioxide-containing nitric acid, nitrogen pentoxide-containing nitric acid and mixed acid; and separating the thus formed cyclotrimethylenetrinitramine.

2. A method of producing cyclotrimethylenetrinitramine, comprising the steps of reacting ammonium methyleneaminosulfonate under exclusion of water at a temperature of between −30° C. and +30° C. with an anhydrous mixture of nitric acid and sulfur trioxide; diluting the thus formed reaction mixture and separating cyclotrimethylenetrinitramine therefrom.

3. A method of producing cyclotrimethylenetrinitramine, comprising the steps of reacting ammonium methyleneaminosulfonate under exclusion of water at a temperature of between −30° C. and +30° C. with an anhydrous mixed acid consisting of nitric acid, sulfuric acid and sulfur trioxide; diluting the thus formed reaction mixture and separating cyclotrimethylenetrinitramine therefrom.

4. A method of producing cyclotrimethylenetrinitramine, comprising the steps of reacting ammonium methyleneaminosulfonate under exclusion of water at a temperature of between −30° C. and +30° C. with an anhydrous mixture of nitric acid and nitrogen pentoxide; diluting the thus formed reaction mixture and separating cyclotrimethylenetrinitramine therefrom.

5. A method of producing cyclotrimethylenetrinitramine, comprising the steps of reacting ammonium methyleneaminosulfonate under exclusion of water at a temperature of between about 0° C. and +20° C. with an anhydrous nitrating agent selected from the group consisting of sulfur trioxide-containing nitric acid, nitrogen pentoxide-containing nitric acid and mixed acid; diluting the thus formed reaction mixture with water and separating cyclotrimethylenetrinitramine therefrom.

6. A method of producing cyclotrimethylenetrinitramine, comprising the steps of reacting ammonium methyleneaminosulfonate under exclusion of water at a temperature of between about −30° C. and +30° C. with nitric acid containing between about 10% and 50% sulfurtrioxide; and separating the thus formed cyclotrimethylenetrinitramine.

7. A method of producing cyclotrimethylenetrinitramine, comprising the steps of reacting ammonium methyleneaminosulfonate under exclusion of water at a temperature of between about −30° C. and +30° C. with nitric acid containing about 10% nitrogen pentoxide; and separating the thus formed cyclotrimethylenetrinitramine.

References Cited in the file of this patent

UNITED STATES PATENTS 2,321,958     Walker _____ June 15, 1943

FOREIGN PATENTS 209,502     Germany _____ Feb. 19, 1908

OTHER REFERENCES

Cupery Industrial and Engineering Chemistry, vol. 30, pages 627–631 (1938).

Bennie et al.: J. Am. Chem. Soc., vol. 72, pages 4457–9 (1950).

Migrdichian: Organic Synthesis, vol. II, pages 1588 to 1595, Reinhold Publishing Co. N.Y. (1957).